July 9, 1957   F. NIEPMANN ET AL   2,798,260
APPARATUS FOR THE MANUFACTURE AND PACKING OF PRESSINGS
OF FIBROUS MATERIAL
Filed Oct. 31, 1950   4 Sheets-Sheet 1

INVENTORS
Friedrich Niepmann
Otto Niepmann
Carl Hahn
Heinz Mittag
BY
Jerome W. Payton
Agt.

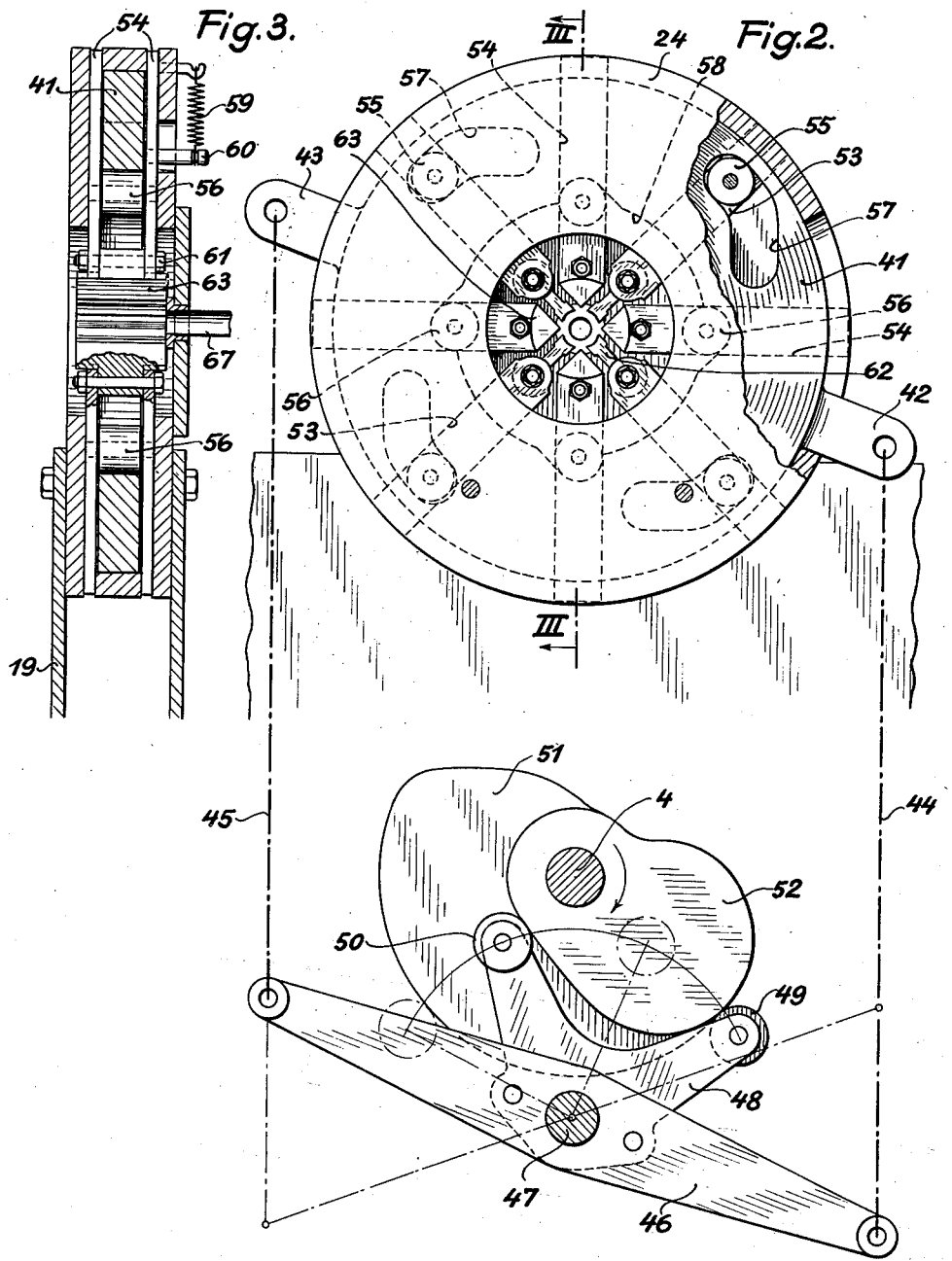

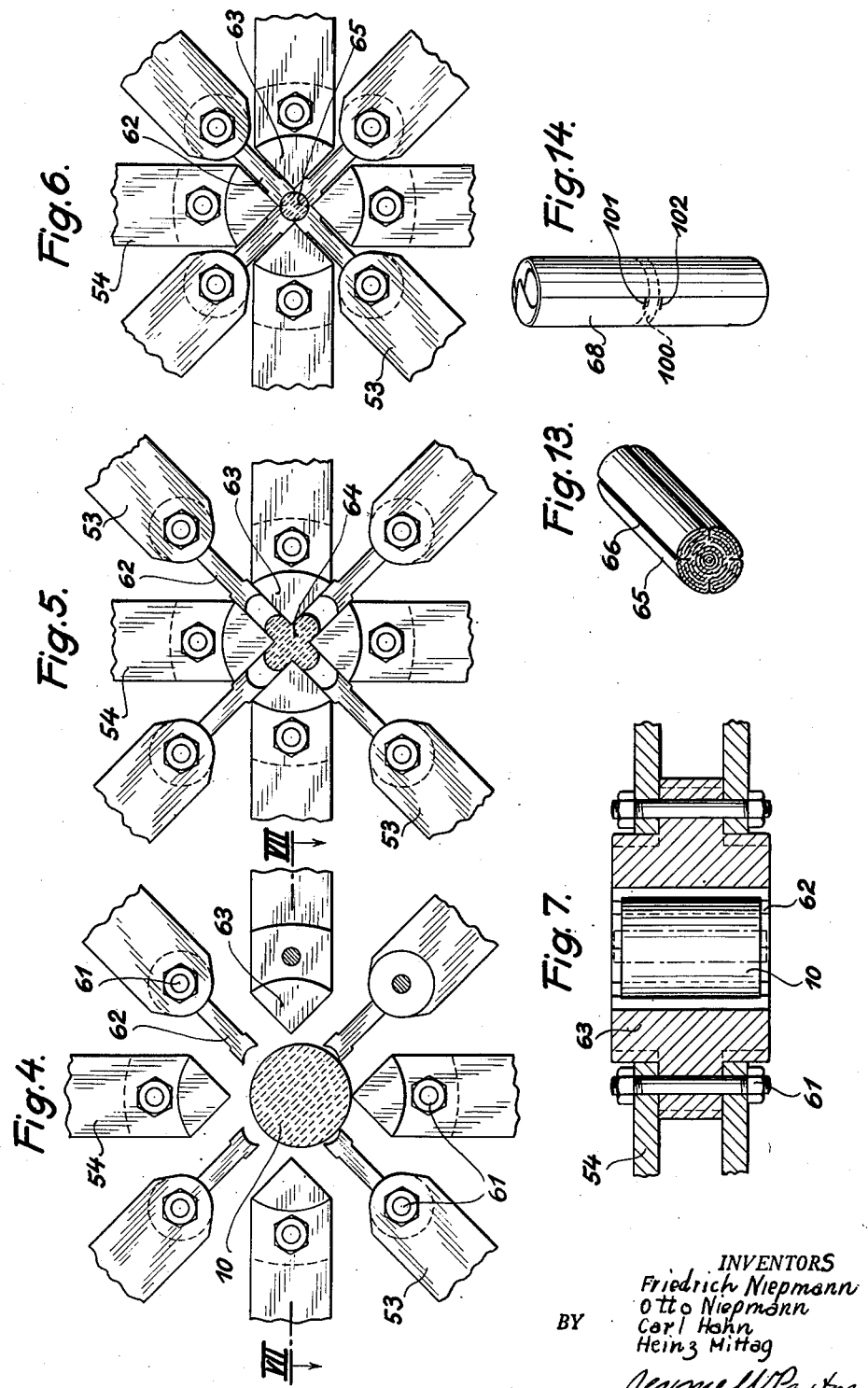

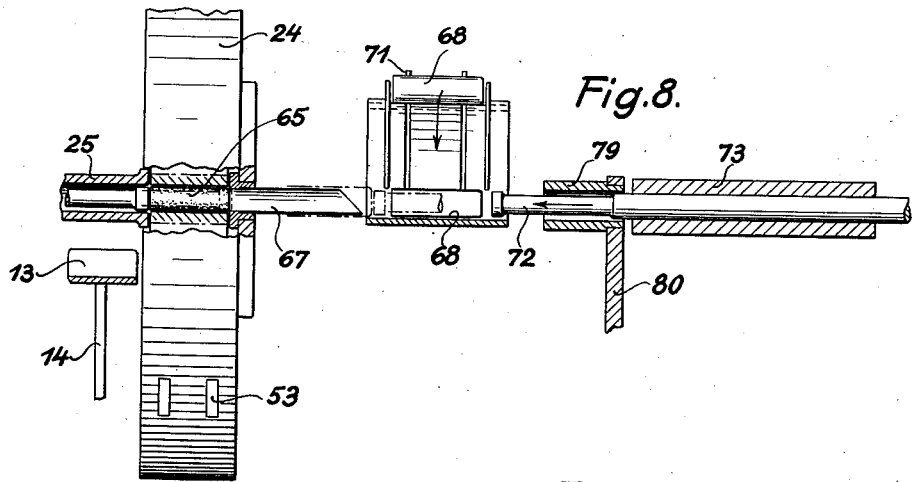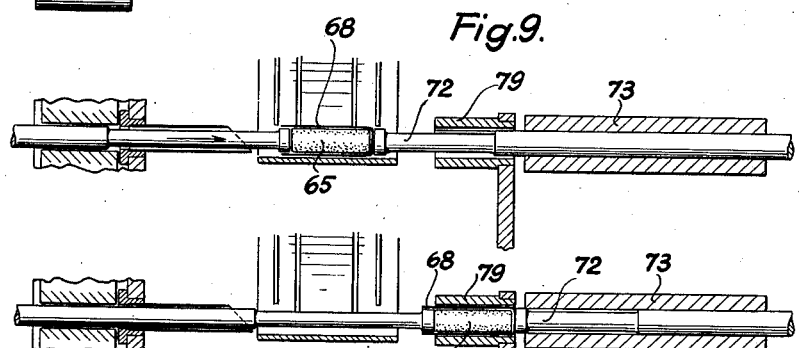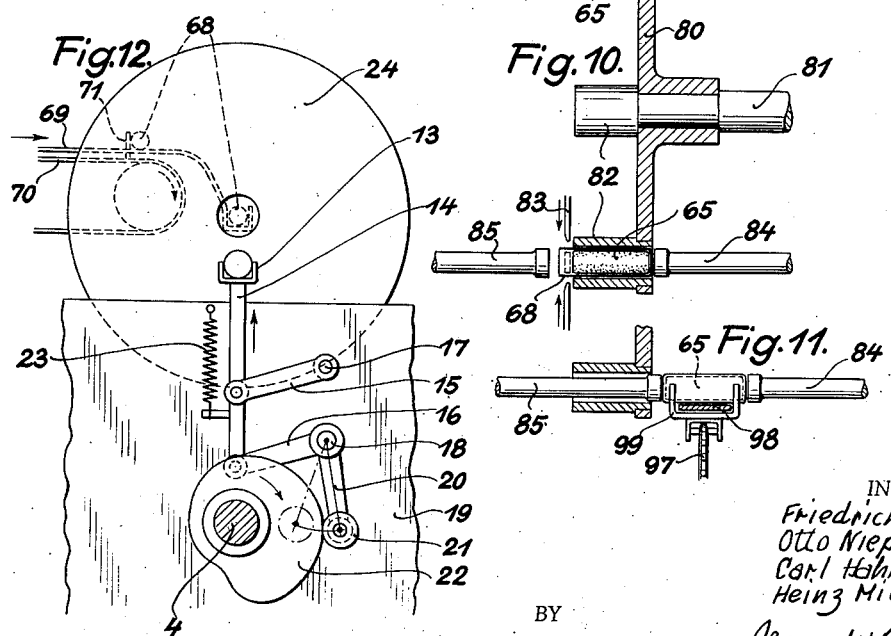

United States Patent Office 2,798,260
Patented July 9, 1957

2,798,260

APPARATUS FOR THE MANUFACTURE AND PACKING OF PRESSINGS OF FIBROUS MATERIAL

Friedrich Niepmann and Otto Niepmann, Gevelsberg, Carl Hahn, Koln, and Heinz Mittag, Dusseldorf, Germany Application October 31, 1950, Serial No. 193,079

4 Claims. (Cl. 19—144.5)

The present invention relates to a method and an apparatus for the manufacture and packing of pressings of fibrous material, e. g. of cotton, cellulose or other absorbent material. In particular, the invention relates to the manufacture of tampons for women's hygiene.

It is an object of the invention to simplify the manufacture of tampons and to obtain tampons with great absorption capacity. To achieve these objects preformed rolls consisting for instance of a wad strip with a thread laid in, are brought into a press mould for being pressed, and the ready pressings are immediately slid into a shell, the open end of which will then be folded together. Preferably the shell serving as a packing is rolled from a transparent cellulose film or the like, is glued together and taken to the apparatus with one end closed.

In order to give such a tampon a sufficiently large suction surface, the preformed roll slid into the press mould is first pressed into a cross-like form by means of pointed press dies and then into a circular form by means of another set of press dies. In this way the ready made pressing obtains notches or grooves considerably enlarging the active surface although the pressing retains the circular form desirable for introduction.

With one apparatus according to the invention, the preformed roll is pressed into the press mould by means of a pusher, an inner part of which pushes the ready made pressing from the press mould through a hollow pin into the packing shell. Special chambers for receiving the pressings and keeping them under pressure for some time to preserve their shape, are not required. As under the invention the pressings are pushed from the press mould immediately into the packing shell, they will retain any required size after having left the press mould. After sliding the pressings into the packing shell and closing said shell the pressings will be sterilized, the shell enclosing the pressings preventing them from swelling.

Each tampon being enclosed by such a wrapping of a transparent cellulose film or the like, a single tampon may be worn hygienically. A wrapped tampon may be provided about its middle with a thread or small ribbon for opening, the wrapping being torn in two pieces and drawn away from the ends of the tampon.

Further objects and advantages of the present invention will be apparent from the following description, reference being made to the accompanying drawing wherein a preferred embodiment of the present invention is clearly shown.

Figure 2 is a side elevation of the press mould and its control appliance;

Figure 3 is a cross sectional view taken on the line III—III of Figure 2;

Figures 4 to 6 show different positions of the press dies;

Figure 7 is a cross sectional view taken on the line VII—VII of Figure 4;

Figures 8–11 show diagrammatically the pushers and rams in different positions;

Figure 12 is a side elevation of the lifting device for the preformed roll taken on the line XII—XII of Figure 1;

Figure 13 shows an unpacked and

Figure 1:
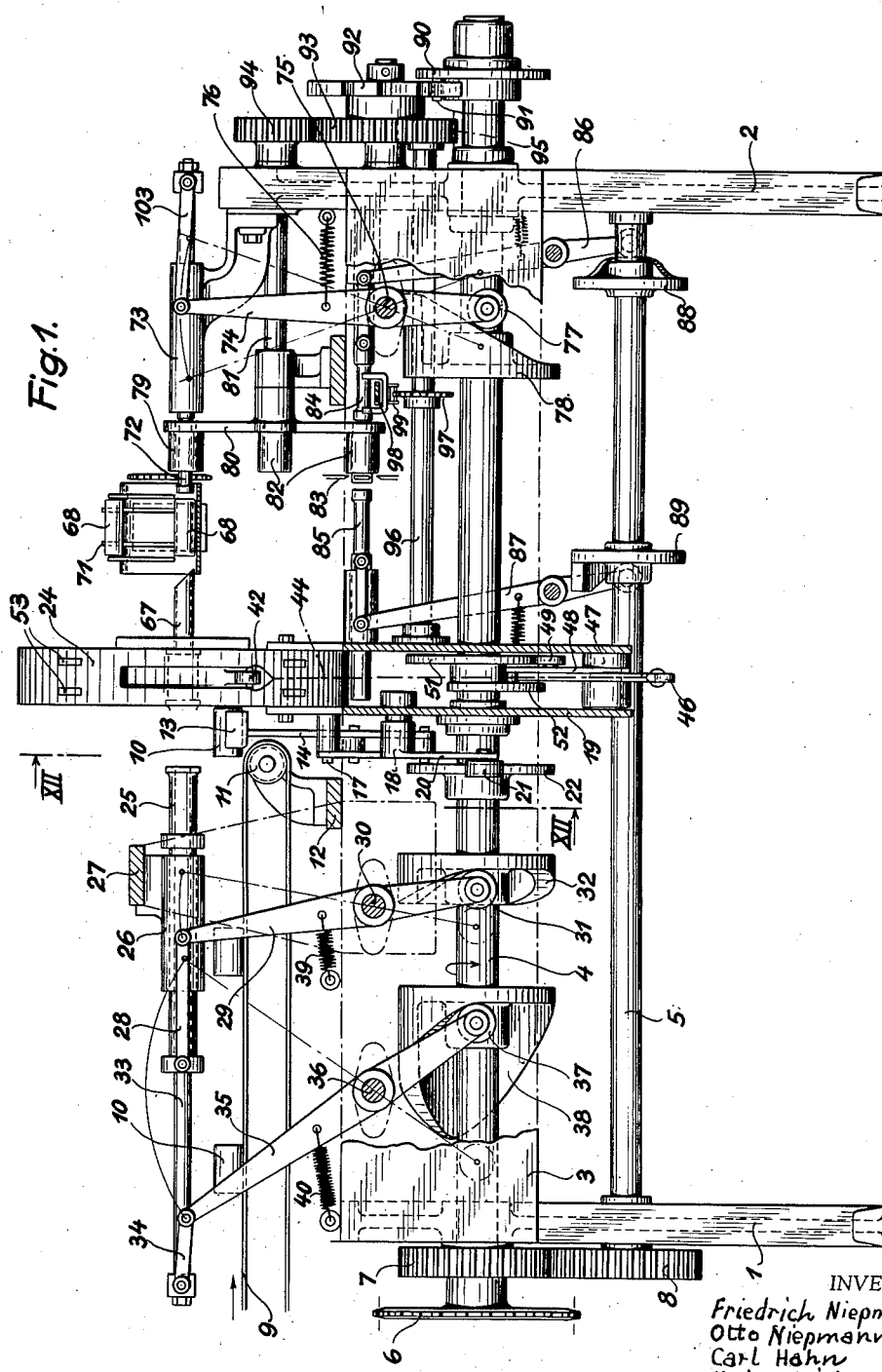
Figure 1 is a front and partly a sectional view of the apparatus.

Figure 14 a packed pressing.

The apparatus consists of the two lateral columns 1 and 2, which are connected with each other by means of the horizontal girder 3. Between the lateral columns there are arranged the main drive shaft 4 and the auxiliary drive shaft 5. The drive shaft is set to rotation by means of a chain wheel 6 or the like, whereas the auxiliary drive wheel is driven by two gears 7 and 8. Above the main drive shaft 4 there is a conveying band 9 which conveys to the apparatus the preformed rolls 10 rolled from a wad strip with a thread laid in. The reversing wheel 11 of said conveying band is supported by a cross bar 12.

The conveying band carries the preformed rolls 10 upon a trough 13 arranged at the upper end of a lifting bar 14 (Figures 1 and 12). The lifting bar 14 is fastened to two steering bars 15 and 16, the joints 17 and 18 of which are fastened to an intermediate wall 19 of the apparatus. The steering bar 16 is connected, by means of an arm 20 with the roller 21, which rolls over the plate cam 22 of the main drive shaft 4. By means of a spring 23 the rods are drawn towards the plate cam. With one revolution of the main drive shaft the trough 13 is lifted from the level of the conveying band 9 to the inlet opening of a press mould 24. The preformed roll 10 lying on the trough 13 will then be pushed into the press mould 24 by means of the round pusher 25, which is slidably supported in a guide 26, said guide being fastened to a cross bar 27. At the end of the round pusher 25 there is hinged a bar 28, which is connected to a double-armed steering lever 29, which is mounted on an axle 30 and bears at its lower end a roller 31 leaning against a cam 32 which is fastened to the main drive shaft 4.

In the interior of the round pusher 25 there is a ram 33, which is connected through a lever 34 with a double-armed steering lever 35 carried by the axle 36 and being also in communication with the cam 38 by means of a roller 37. By means of springs 39 and 40 the two steering levers 29 and 35 are drawn towards the cams.

When a preformed roll 10 is lifted so as to be brought before the middle of the press mould 24, the round pusher 25 with its ram 33 moves to the right thus pushing the preformed roll into the press mould.

With reference to Figures 2 and 3, a plate cam 41 is arranged within the press mould, said plate cam being provided at two opposite points with arms 42 and 43. To these arms there are hingedly connected means 44 and 45 for drawing which lead to a double-armed lever 46 which is capable of being swung round the joint 47. To this lever 46 is rigidly connected a double supporting arm 48 which is provided with two steering rolls 49 and 50, the roller 49 leaning against a plate cam 51 and the roller 50 against a plate cam 52. The said two plate cams are connected to the main drive shaft 4.

On either side of the plate cam 41 there are four guide bars each (53 and 54) in appropriate slots of the press mould. Between two of these guide bars lying side by side there are arranged steering rollers 55 and 56 respectively. For the steering rollers 55 the plate cam is provided with curved cuttings 57, whereas the rollers 56 are displaced in one direction by the inner edge 58 of the plate cam 41 and drawn back by means of tension springs 59 one of them being indicated in Figure 3. The springs 59 pull the pins 60 which are connected to the guide bars 54.

Press dies 62 are fastened to the inner edges of the guide bars 53 by means of screws 61, whereas the guide bars 54 are provided with pointed press dies 63. The press dies are steered in such a way that the four press dies 63 first move towards the center so that they are brought from the position shown in Figure 4 to the one shown in Figure 5. In this way the preformed roll 10 slid into the press mould is so pressed that it obtains a substantially cross-like shape. The four narrow press dies 62 arranged between said pointed ones will then be moved toward the center in like manner to give the cross-shaped pressing 64 the final circular form of the ready made tampon 65. The tampon thus has four longitudinal grooves 66 which enlarge considerably its active surface and accordingly its efficiency.

After pressing the press dies are somewhat loosened, and the tampon 65 is pushed through the hollow pin 67 out of the press mould by means of the ram 33 (vide Figures 8 to 10). Beside this pin there is arranged a feeding device for a packing shell 68 which may for instance be rolled from a transparent cellulose film and already be closed at one end. The feeding device consists of a slide rail 69 under which a conveying band 70 with pins 71 projecting through slots in the rail 69 is provided which conveys the packing shell 68 before the hollow pin 67.

As may be seen from Figure 8 the packing shell 68 is slid over the hollow pin 67 by means of a ram 72 which is mounted in a guide 73. Through a draw bar 103 the ram 72 is connected to the double-armed steering lever 74 hinging on the joint 75 and being pressed against the cam plate 78 through the roller 77 by means of the spring 76. The cam plate 78 is mounted on the main drive shaft 4.

The ram 72 remains in its extreme left position up to the time that the completed pressing 65 is slid into the packing shell 68 by means of the ram 33. On this the ram 33 with the packing shell 68 and the inserted tampon 65 move to the right, the ram 72 also sliding back to the right. In this way the tampon 65 with the packing shell is conveyed into a socket 79 (vide Figure 9). This socket is mounted on four-armed lever 80 which is fastened to a shaft 81 and provided at its end with similar sockets 82. After conveying the tampon 65 into the socket 79, the lever 80 is swung, and the packing shell 68 with the tampon 65 inserted is carried to a folding machine of a known type, and is closed while being held by a ram 84 by means of the folding knives 83. Thereupon the wholly completed and packed tampon is pushed out of the socket 82 by means of another ram 85, the ram 84 sliding back. This is shown in Figure 11. The completed tampon is then taken to a conveying band 98 to leave the machine.

The two rams 84 and 85 are displaced by means of double-armed steering levers 86 and 87 respectively, which are steered by plate cams 88 and 89. The plate cams are mounted on the auxiliary drive shaft 5.

The shaft 81 for the four-armed lever 80 is turned by means of a driving disk 90 with a projecting pin 91 which turns a Maltese cross gradually. Through said Maltese cross the shaft 81 is turned by means of two gears 93 and 94. At the same time the shaft 96 of a driving wheel 97 for the conveying band 98 with its conveying parts 99 is driven through a gear 95.

A completed and packed tampon may be sterilized.

As shown in Figure 14 it is advantageous to insert a small ribbon 100 for opening the device or a thread in the middle of the packing shell 68 may be used, the packing shell being provided on either side with incisions 101 and 102 to facilitate taking the end of the thread or ribbon. By tearing off the small ribbon or the thread the shell is torn and its two halves may be removed from the tampon in a most simple way. Preferably said ribbon is coloured to show how it is to be handled easily.

What we claim is:

1. Apparatus for making pressings of highly absorbent fibrous materials comprising a press mould, a pusher moving a preformed cylindrical roll into the mould, means within the mould pressing the roll initially into substantially cross like form to enlarge the active surface thereof and further means thereafter pressing the roll into cylindrical form, a hollow pin in axial alignment with the mould, means sliding a packing shell over the hollow pin, a ram guided within the pusher forcing the roll through and into the packing shell thus preserving the shape of the roll leaving the mould and means operating the pusher and ram.

2. The apparatus defined in claim 1 wherein a lifting device elevates the preformed roll from a conveyor band to the press mould.

3. The apparatus defined in claim 2 wherein a conveying means positions the packing shell in alignment with the hollow pin and the means sliding the shell over the hollow pin is a further reciprocable ram, the movement of the further ram away from the hollow pin as the first ram forces the roll into the shell serving as a back stop.

4. The apparatus defined in claim 3 wherein a socket is swingable into the path of movement of the shell with the roll therein and the first ram presses the roll within the shell and means folds the open end of the shell.

References Cited in the file of this patent

UNITED STATES PATENTS

| | | |
|---|---|---|
| 1,108,696 | Casey | Aug. 25, 1914 |
| 1,932,383 | Richardson | Oct. 24, 1933 |
| 1,964,411 | Beutal | June 26, 1934 |
| 2,058,275 | Voss | Oct. 20, 1936 |
| 2,152,230 | Webb | Mar. 28, 1939 |
| 2,188,923 | Robinson | Feb. 6, 1940 |
| 2,263,909 | Webb | Nov. 25, 1941 |
| 2,330,257 | Bailey | Sept. 28, 1943 |
| 2,425,004 | Rabell | Aug. 5, 1947 |
| 2,458,685 | Crockford | Jan. 11, 1949 |
| 2,464,310 | Harwood | Mar. 15, 1949 |
| 2,566,190 | Greiner et al. | Aug. 28, 1951 |
| 2,714,230 | Young | Aug. 2, 1955 |